United States Patent [19]

Moslo

[11] 3,710,988
[45] Jan. 16, 1973

[54] INJECTION MOLDING MACHINE

[76] Inventor: Ernest P. Moslo, 12700 Lake Avenue, Lakewood, Ohio 44107

[22] Filed: Sept. 21, 1970

[21] Appl. No.: 73,910

[52] U.S. Cl. .................. 222/404, 425/245, 259/191
[51] Int. Cl. .............................................. G01f 11/00
[58] Field of Search .................. 18/30 SQ, 30 SM, 30 SR, 30 AM, 18/30 AC; 425/245; 259/191; 222/404

[56] References Cited

UNITED STATES PATENTS 3,438,393  4/1969  Godley ......................... 18/30 SQ X
3,099,861  4/1963  Gaspar et al .................. 18/30 SQ Primary Examiner—H. A. Kilby, Jr.
Attorney—Baldwin, Egan, Walling & Fetzer

[57] ABSTRACT

An injection molding machine comprising a feed screw which is rotatable and reciprocal in a plasticizing housing of a machine wherein the feed screw includes a head having a piston portion and a tapered nose portion projecting forwardly from the piston portion with the head including a generally central chamber therein communicated by means of passageways with the forward and rearward ends of said piston portion, and with there being centrally arranged movable ball valve means disposed in guided relation in said central chamber adapted for coaction with a valve seat for preventing return flow of plastic from the forward end of said piston portion to the rearward end thereof through said passageway means during the forward dispensing stroke of the feed screw.

13 Claims, 9 Drawing Figures

PATENTED JAN 16 1973

3,710,988

INVENTOR.
ERNEST P. MOSLO
BY
Baldwin, Egan, Walling & Fetzer
ATTORNEYS

INJECTION MOLDING MACHINE

This invention relates in general to injection molding machines of the type having a rotatable and reciprocal feed screw for injecting plastic into a mold, and more particularly relates to a molding machine of the latter type which includes a novel arrangement of non-return valve mechanism disposed within the head of the feed screw for preventing the return of plastic from the forward end of the piston portion of the head of the feed screw to the rearward end thereof upon forward movement of the feed screw in its operation of emitting plastic material during its dispensing stroke.

BACKGROUND OF THE INVENTION

Injection molding machines having rotatable and reciprocal feed screw mechanism with non-return valve mechanism coacting therewith are known in the prior art. U.S. Pat. No. 3,098,861 issued Aug. 6, 1963 to E. Gaspar et al. discloses one arrangement of such mechanism utilizing a plurality of non-return valve mechanisms each formed from a movable ball coating in a respective diagonally arranged receiving slot in the head of the feed screw, and adapted for engagement with a valve seat.

U.S. Pat. No. 3,163,693 discloses an injection molding machine having a ball check arrangement at the piston end of the feed screw for preventing back flow of plasticized material. However, the mechanism of such patent is such that it may not operate to provide uniform flow of plastic material past the ball check valve, and the mechanism includes a valve 50 for controlling the flow of plasticized material from the feed screw into dispensing block 31, and therefore is of a somewhat more complex arrangement.

SUMMARY OF THE INVENTION

The present invention provides an injection molding mechanism having a rotatable and reciprocal feed screw disposed in a plasticizing housing of the machine, and wherein non-return valve means is positioned in guided relation in the forwardly disposed head of the feed screw for preventing the flow of plastic material from the forward end of the piston portion of the head to the rear end thereof during the forward dispensing stroke of the feed screw means, while permitting uniform flow of plastic material from the rear end to the forward end of the piston portion during predetermined rotation of the screw.

Accordingly, an object of the invention is to provide a novel injection molding machine having a rotatable and reciprocal feed screw mechanism and wherein valve means is provided in the head of the feed screw for preventing back flow of plastic material from the forward end of the piston portion of the head to the rearward end thereof during the dispensing stroke of the feed screw.

A still further object of the invention is to provide an injection molding mechanism of the latter described type wherein the head is removable from the remainder of the feed screw, and wherein the head includes a centrally located chamber therein for receiving a ball valve comprising said valve means, and with the seat of the valve means being disposed in the piston portion of the feed screw, and wherein passageway means communicate the rearward end of the piston portion with the forward end thereof, with the chamber in the head having stop means therein located centrally thereof for limiting forward movement of the ball of the valve means adapted to hold the ball generally centrally located for equalized flow of plasticized material to opposite sides of the head portion.

Another object of the invention is to provide an injection molding mechanism of the latter described type wherein the passages communicating the rearward end of the piston portion of the feed screw to the forward end of the piston portion thereof open into recesses formed in the nose section of the head of the feed screw mechanism on opposite sides of the nose section for uniform flow of plastic material forwardly of the feed screw mechanism for injection into a receiving mold during the dispensing stroke of said feed screw.

Other objects and advantages of the invention will be apparent from the following description taken in conjunction with the accompanying drawings, wherein:

DESCRIPTION OF THE PREFERRED EMBODIMENTS

Figure 1:
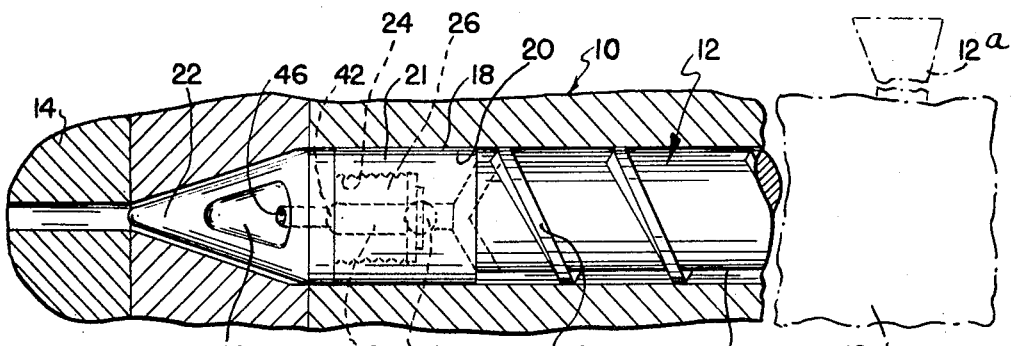
FIG. 1 is a fragmentary longitudinal sectional view through the plasticizing housing of an injection mechanism embodying the invention.

Referring now again to FIG. 1, there is illustrated an injection molding mechanism comprising a plasticizing housing 10 containing rotatable and reciprocal feed screw mechanism 12. Plastic granules are adapted for entry at an inlet 12a in the rear portion of the housing and the plastic granules are plasticized and formed into molten plastic material in the housing by rotation of the feed screw mechanism. Such plasticized material is then adapted to be ejected from the housing through injection nozzle 14 and into a mold or the like for molding purposes. The feed screw extends through the full length of the housing and at least as far as the above referred to inlet, and is provided with driving means for rotating the screw and moving it axially (not shown).

At the forward end of the feed screw, there is provided a head portion 18 which at its rearward part is cylindrical in configuration and possesses a relatively close sliding fit in the bore 20 of housing 10. Head 18 of the feed screw includes a cylindrical-like piston portion 21 and a nose portion 22 projecting forwardly from the piston portion. Nose portion 22 and a forward part of the piston portion, in the embodiment illustrated is detachable from the remainder of the head portion. The rear piston portion 21 has an open ended threaded recess 24 (FIG. 8) formed therein for receiving in threaded coaction the shank section 26 (FIG. 5) of the detachable nose cone 22. Cavity 24, as can be best seen in FIG. 8, has an abutment shoulder 28 formed therein which is adapted for engagement with the rear end of the shank 26 of the nose cone so as to limit the inward movement thereof into cavity 24. Also the cavity at its rearward end is counterbored as at 30 and receives therein the extended embossment 32 of shank 26 of the nose cone member 22 in relatively snug fitting relation. A valve seat 34 is formed on the axial center of cavity 24 in head 18, with such valve seat being communicated via longitudinal axial passageway section 36 with passageways 38, 38a, which are disposed in the feed screw and at a diagonal with respect to the longitudinal axis of the feed screw. The lengthwise axes of such passageways 38, 38a are disposed in a plane passing through the lengthwise axis of passageway section 36 and the longitudinal axis of recess 24, and such passageways 38, 38a merge with one another and with passageway section 36 on the longitudinal axis of the latter section.

Figure 2:
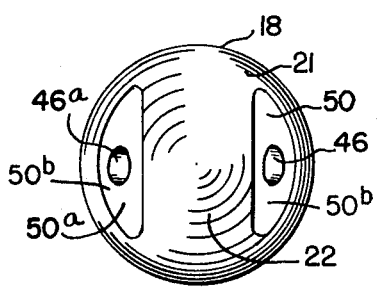
FIG. 2 is an enlarged end elevational view of the head of the feed screw taken generally along the plane of line 2—2 of FIG. 5 looking in the direction of the arrows.
Figure 3:
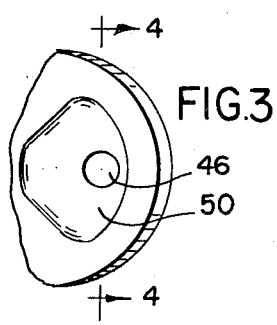
FIG. 3 is an enlarged fragmentary view taken generally along the plane of line 3—3 of FIG. 5 looking in the direction of the arrows.

As can be best seen in FIG. 2, passageway 38 opens onto the exterior of body 37 of the screw at a location where the last flight 39 of the screw abuts against the piston portion 21 while the opening to passageway 38a is circumferentially displaced 180° from the passageway 38 and is located in the groove of the feed screw. Passageways 38, 38a are disposed at an angular relationship of approximately 60° with respect to a horizontal plane passing through the longitudinal axis of the feed screw and as can be best seen in FIG. 8.

Nose cone member 22 has a lengthwise extending chamber 40 (FIG. 5) formed therein and which is adapted to communicate with the seat 34 when the shank 26 is disposed in engagement with the shoulder portion 28 of the cavity in piston portion 21 of the head. Chamber 40 extends forwardly and is defined at its forward end by concave stop portion 42 which is adapted for engagement with the ball 44 of the check valve for limiting forward movement of the ball member in chamber 40, and for positioning the ball member centrally in the chamber during flow of plastic material from the rearward end of the piston portion to the forward end thereof. Ball member 44 has a rolling fit in chamber 40 for ready lengthwise movement therein with the diameter of chamber 40 being just slightly greater than the diameter of ball 44.

Figure 4:
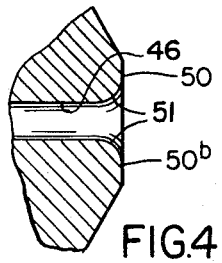
FIG. 4 is a sectional view taken generally along the plane of line 4—4 of FIG. 3 looking in the direction of the arrows.
Figures 5, 6:
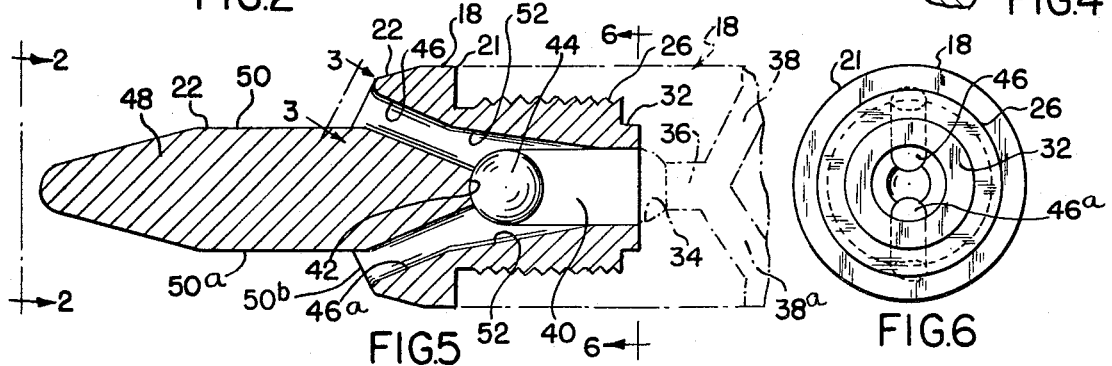
FIG. 5 is an enlarged sectional view of the detachable portion of the head of the feed screw of the FIG. 1 assembly.
FIG. 6 is an end elevational view taken generally along the plane of line 6—6 of FIG. 5.
Figures 7, 8:
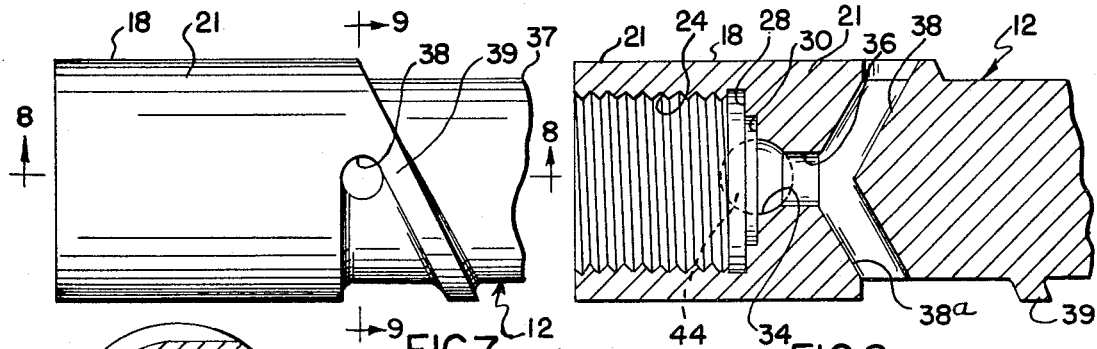
FIG. 7 is an elevational view of the portion of the head of the feed screw which is secured to the body of the screw.
FIG. 8 is a sectional view taken generally along the plane of line 8—8 of FIG. 7 looking in the direction of the arrows.
Figure 9:
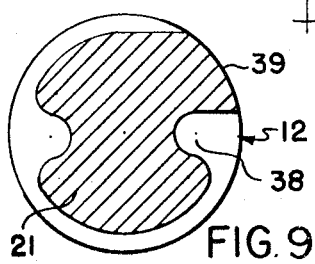
FIG. 9 is a sectional view taken generally along the plane of 9—9 of FIG. 7 looking in the direction of the arrows.

Communicating with the forward portion of chamber 40 are passageways 46, 46a the openings to which are disposed circumferentially 180° from one another, and which open at their forward ends onto the exterior of nose portion 48 of nose cone member 22. Such passageways 46, 46a open into a respective recess 50, 50a formed in the surface of the nose portion 48 of nose cone member 22. Each recess 50, 50a is defined in part by generally planar end surface 50b, extending generally transversely of the nose cone member 22. Passageways 46, 46a are disposed at angles of approximately 22° with respect to a horizontal plane passing through the longitudinal axis of the nose cone member 22, with the axes of passageways 46, 46a intersecting the lengthwise axis of member 22 and chamber 40 forwardly of the ball 44 when the latter is in seated condition on valve seat 34 (FIG. 8). At the locations of opening of the passageways 46, 46a into the surface 50b of the respective recess 50, 50a, the edges of opening are evenly rounded as at 51 (FIG. 4) with the planes of such openings being disposed at 90° with respect to the respective passageway axis, for uniform and smooth flow of plastic material through the passages 46, 46a. Adjacent the rearward end of each passage 46, 46a they may be cylindrically grooved out as at 52 for increased flow of plastic material between the passageways 46, 46a and the central chamber 40 and to insure flow of plasticized material past the ball member 44 of the valve when the valve is in its forwardmost open position as shown in FIG. 5. The axial center line of each grooved out portion 52 is preferably disposed at an angle of approximately 8° with respect to the horizontal plane passing through the lengthwise axis of the nose cone member.

Operation of the mechanism may be as follows: Rotation of the feed screw forces plastic material forwardly in the plasticizing housing 10 and through the passageways 38, 38a, passageway 36, and past the valve mechanism, such plastic material forcing the ball 44 to move away from the valve seat 34, and thus open the valve to forward flow of plastic material. The plastic material flows around the ball valve 44 which is then in its forwardmost position as shown for instance in FIG. 5, out passageways 46, 46a and recesses 50, 50a in the nose cone member, and thence into the injection nozzle 14. When a predetermined charge has been emitted forwardly of piston portion, upon initiation of the dispensing stroke of the feed screw mechanism, the latter moves linearly forward whereupon the piston portion causes the charge of plasticized material to be injected through injection nozzle 14 into the mold. During such forward dispensing stroke of the feed screw, the force of the plastic material forwardly of the piston portion causes the ball member 44 of the valve mechanism to be forced rearwardly against the valve seat 34 to close off the passageway 36 and prevent backflow of plastic material out of the inlet passages 38, 38a. This of course prevents any backflow pressure from being applied to the flights of the screw.

The plastic material flowing from behind the piston portion to the injection nozzle during rotation of the screw flows smoothly through the passages and chamber in the head and due to the centering of the ball member 44 of the valve mechanism in chamber 40, the plastic flows evenly to both sides of the nose portion of the head. The movement of the ball 44 is guided in chamber 40 by the defining surfaces of the latter, and plastic material is permitted to freely flow past the valve member when it is in its forwardmost position due to the grooving out of the passages 46, 46a adjacent their mergence with chamber 40.

From the foregoing description and accompanying drawings it will be seen that the invention provides a novel injection molding mechanism which includes a rotatable and reciprocal feed screw means having a head including a piston portion thereon for effecting the dispensing stroke of the screw and wherein a centrally disposed check valve assembly is provided in the head for preventing back flow of plasticized material into the plasticizing chamber during the dispensing stroke of the feed screw. The valve mechanism comprises a ball valve member movable in a lengthwise extending chamber in the head and is guided in its lengthwise movement from a seating position wherein it prevents backward flow of plasticized material into the plasticizing chamber to a completely unseated or forwardly disposed position wherein the plasticized material may flow pass the ball valve, and uniformly to opposite sides of the nose cone portion of the feed screw mechanism. Means are provided in the chamber for centering the valve in its forwardly disposed position so that flow of plasticized material is evenly divided to opposite sides thereof for a more uniform application of the plasticized material to the mold during the dispensing stroke of the feed screw mechanism.

The terms and expressions which have been used are used as terms of description and not of limitation and there is no intention in the use of such terms and expressions of excluding any equivalents of any of the features shown or described, or portions thereof, and it is recognized that various modifications are possible within the scope of the invention claimed.

What is claimed is:

1. Molding mechanism comprising in combination, an elongated plasticizing housing having an inlet for granular material and an outlet spaced from the inlet for plasticized material, feed screw means mounted within the housing for rotation and reciprocation therein and having thereon a screw thread which fits the interior of the housing, said feed screw means including a head adjacent an end thereof comprising a piston portion and a tapered nose portion projecting forwardly from the piston portion, said piston portion being adapted to have a sliding fit in said housing, a chamber in said head, a valve seat in said chamber first passageway means communicating said chamber with the forward end of said piston portion and other passageway means communicating said chamber with the rearward end of said piston portion, a ball valve member movably mounted in said chamber and adapted for seating engagement with said seat for preventing return of plasticized material from said forward end of said piston portion to said rearward end thereof upon the forward dispensing stroke of said feed screw means, and stop means in said chamber forwardly of said seat for engagement with said ball valve member to limit its forward movement during the flow of plasticized material from the rearward end of said piston portion to the forward end thereof and to locate the valve member generally centrally of said chamber in a direction transverse thereof, whereby plasticized material can flow evenly from said chamber about said valve member and out said first passageway means.

2. A mechanism in accordance with claim 1 wherein a portion of said head is detachable from the remainder of said head of said feed screw means, and wherein said piston portion is partially formed on said remainder and partially on said detachable portion of said head.

3. A mechanism in accordance with claim 1 wherein said passageway means from said chamber to rearwardly of said piston portion communicates with the exterior of said screw means at the juncture of the screw flight with said head, the last mentioned passageway means comprising opposed passages communicating at the inner ends thereof with said chamber and each extending rearwardly therefrom at an angle of approximately 60° with respect to the lengthwise axis of said chamber.

4. A mechanism in accordance with claim 1 wherein said nose portion is of conical-like configuration and has recesses formed in opposite sides thereof, said recesses being spaced evenly from one another in a direction circumferentially of said nose portion, said passageway means communicating said chamber with the forward end of said piston portion opening into said recesses, and comprising a pair of passages diverging uniformly with respect to one another and with respect to the lengthwise axis of said chamber, said passages being disposed in a plane passing through said axis of said chamber.

5. A mechanism in accordance with claim 1 wherein the exit end of said first passageway means communicating said chamber to a point forwardly of said piston portion comprises an opening having a flared periphery and communicating with a recess in the side of said nose portion, said recess being defined in part by an end surface extending generally transverse to said nose portion with the lengthwise axis of said first passageway means being disposed in the plane of the lengthwise axis of said chamber and being generally perpendicular to said surface, the first mentioned lengthwise axis diverging with respect to the second mentioned lengthwise axis in a forward direction.

6. Molding mechanism comprising in combination, an elongated plasticizing housing having an inlet for granular material and an outlet spaced from the inlet for plasticized material, feed screw means mounted within the housing for rotation and reciprocation therein and having thereon a screw thread which fits the interior of the housing, said feed screw means including a head adjacent an end thereof comprising a piston portion and a tapered nose portion projecting forwardly from the piston portion, said piston portion being adapted to have a sliding fit in said housing, a chamber in said head, a valve seat in said chamber, first passageway means communicating said chamber with the forward end of said piston portion and other passageway means communicating said chamber with the rearward end of said piston portion, a valve member mounted in said chamber and adapted for seating engagement with said seat for preventing return of plasticized material from said forward end of said piston portion to said rearward end thereof upon the forward dispensing stroke of said feed screw means, a portion of said head being detachable from the remainder of said head of said feed screw means, said piston portion being partially formed on said remainder and partially on said detachable portion of said head, and wherein said detachable portion of said head includes a shank projecting rearwardly, and means on said shank for fastening said detachable portion to the remainder of the head of said feed screw means.

7. A mechanism in accordance with claim 1 wherein said chamber is of elongated cylindrical-like configuration and of a size to guide the movement of said ball valve member longitudinally of said head during a molding operation of said mechanism, said stop means in said chamber being adjacent the forward end thereof and limiting the forward movement of said valve member with respect to said chamber, said stop means having a configuration complementary to said ball valve member for locating the valve member generally centrally with respect to said chamber, said first passageway means comprising a pair of passages diverging with respect to one another and extending diagonally from said chamber outwardly to open onto said nose portion, the exit openings of said passages being diametrically opposed on said nose portion, the lengthwise axis of said passages being disposed in a plane passing through the lengthwise axis of said chamber.

8. A mechanism in accordance with claim 4 wherein each of said recesses is of a materially larger size than the cross-sectional size of the respective first mentioned passageway means coacting therewith, said recesses aiding in providing for smooth extrusion of plasticized material from the rearward end of said piston portion to the forward end thereof, each respective passage being enlarged adjacent its juncture with said chamber so as to permit more free flow of plasticized material from said chamber to said passages and past said ball valve member, when the latter is disposed against said stop means.

9. A mechanism in accordance with claim 1 wherein the axis of said passageway means communicating said chamber with the forward side of said piston portion is rectilinear and is disposed at an angle of approximately 22° with respect to a horizontal plane passing through the lengthwise axis of said head.

10. A mechanism in accordance with claim 1 wherein said plasticizing housing comprises a compression zone adjacent said head and a feed zone spaced rearwardly from said compression zone.

11. A mechanism in accordance with claim 1 wherein said passageway means communicating said chamber with the rearward end of said piston portion comprises diagonally extending substantially rectilinear passageways extending rearwardly at an angle of approximately 60° with respect to a horizontal plane through the lengthwise axis of said feed screw means, said passageways intersecting at said axis, and a longitudinally extending passageway section communicating with said passageways at said intersection, said valve seat defining the entrance way to said chamber from said passageway section, and said seat being of a configuration complementary to that of said ball valve member and when engaged by said valve member being adapted to close said passageway section and thus prevent communication between said chamber and said diagonally extending passageways.

12. A mechanism in accordance with claim 4 wherein said first passageway means communicating with said recesses have widened inner ends at their juncture with said chamber.

13. A mechanism in accordance with claim 4 wherein each of said recesses includes a generally planar end surface extending generally transverse of said nose portion, the axes of said passageway means communicating with said recesses opening into the latter in generally perpendicular relation.

* * * * *